United States Patent [19]
Fitzgerald

[11] 3,940,743
[45] Feb. 24, 1976

[54] INTERCONNECTING UNIT FOR INDEPENDENTLY OPERABLE DATA PROCESSING SYSTEMS

[75] Inventor: Brian P. Fitzgerald, Framingham, Mass.

[73] Assignee: Digital Equipment Corporation, Maynard, Mass.

[22] Filed: Nov. 5, 1973

[21] Appl. No.: 412,572

[52] U.S. Cl. .............................................. 340/172.5
[51] Int. Cl.² ........................................ G06F 15/16
[58] Field of Search ................................ 340/172.5

[56] References Cited
UNITED STATES PATENTS

| | | | |
|---|---|---|---|
| 3,566,363 | 2/1971 | Driscoll, Jr. ...................... | 340/172.5 |
| 3,581,291 | 5/1971 | Iwamoto et al. .................. | 340/172.5 |
| 3,631,405 | 12/1971 | Hoff et al. ......................... | 340/172.5 |
| 3,638,195 | 1/1972 | Brender et al. .................... | 340/172.5 |
| 3,643,223 | 2/1972 | Ruth et al. ......................... | 340/172.5 |
| 3,670,306 | 6/1972 | Fox et al. .......................... | 340/172.5 |
| 3,678,467 | 7/1972 | Nussbaum et al. ............... | 340/172.5 |
| 3,710,349 | 1/1973 | Miwa et al. ....................... | 340/172.5 |
| 3,735,360 | 5/1973 | Anderson et al. ............... | 340/172.5 |
| 3,753,234 | 8/1973 | Gilbert et al. .................... | 340/172.5 |
| 3,771,137 | 11/1973 | Barner et al. ..................... | 340/172.5 |

*Primary Examiner*—Gareth D. Shaw
*Assistant Examiner*—Paul R. Woods
*Attorney, Agent, or Firm*—Cesari and McKenna

[57] ABSTRACT

A unit for interconnecting otherwise independently operable data processing systems. When one data processing system addresses the interconnecting unit, the unit acts like a peripheral device. It converts the address to a physical memory address for the other data processing system. Furthermore it interrupts the other system to effect a data transfer either to or from the other system.

19 Claims, 9 Drawing Figures

INTERCONNECTING UNIT FOR INDEPENDENTLY OPERABLE DATA PROCESSING SYSTEMS

BACKGROUND OF THE INVENTION i. Cross-references to related patents and publications The following references, including patents assigned to the same assignee as the present invention, describe aspects of a data processing system which are particularly adapted for utilizing this invention.

a. U.S. Pat. No. 3,614,741 issued Oct. 19, 1971, and entitled "Data Processing System With Instruction Addresses Identifying One of a Plurality of Registers Including the Program Counter";
b. U.S. Pat. No. 3,710,324 issued Jan. 9, 1973, and entitled "Data Processing System";
c. *PDP-11 Peripherals and Interfacing Handbook*, Digital Equipment Corporation, 1971.

ii. Field of the Invention

This invention relates to data processing systems and more specifically to the interconnection of otherwise independently operable digital computer systems.

iii. Prior Art

A digital computer system normally includes a central processor unit, a random access memory unit and a number of peripheral units. These units are usually interconnected by some means, such as one or more buses as described in the above-identified U.S. Pat. No. 3,710,324. Generally these units can be designated "system resources."

Some systems include two or more sets of system resources including multiple central processing units. These system resources may then be arranged differently in each set. In one approach the different central processor units may be connected with different resources to form normally independently operable digital computer systems. To achieve improved operating efficiencies, however, it is oftentimes desirable for one set of system resources to be able to use the resources of another set.

For example, one central processor unit and its associated memory and peripheral units may perform arithmetic operations while another set of system resources performs input/output functions. In large multiprocessor systems there may be a library of programs on several disk memory units. In order to improve storage efficiency, it may be desirable to store programs in one set of resources and then allow the other sets to retrieve individual programs as they are needed for processing.

In one interconnecting approach, one memory unit has two "ports" and can be connected to two digital computer systems as a common memory. One system transfers data to a memory location in the multi-port memory which is common to both systems. Then a series of control signals cause the other digital computer system to use that data.

In another approach, a buffer register connects two systems. A first system moves data to the buffer and sends an interrupting signal to the second system. The second system responds to the signal with a program which moves the data in the buffer to a new location and sends another interrupting signal back to the first system. The first system receives the interrupting signal from the second system, notes that the transfer is finished and continues its operation.

These are fairly simple approaches to implement but they have several disadvantages. For one, a program in one system cannot directly address a location in the other system. In systems where peripheral devices have memory addresses, it is not possible to transfer data from one system directly to a peripheral device in another system. Further, such systems perform slower. This is especially true in the second approach because the first system can not continue operating until the returning signal is received from the other system. In both approaches programming is more complex.

In still another approach, an interconnecting circuit provides a data path between the buses in otherwise independently operable data processing systems. Usually such systems have a reserved block of addresses for identifying various registers in different peripheral units. The block is often termed an I/O page, and it resides in memory or is constituted by a range of available peripheral addresses. A fixed number of these locations are assigned to the interconnecting unit. The interconnecting unit reassigns an address and effects a transfer to the other system. In these systems the I/O page comprises a fixed number of locations. Thus, the number of locations is usually limited to only a few locations (e.g., 512 locations). Larger numbers would severely restrict the size of the number of locations in the memory or available for actual input/output operations.

Therefore, it is an object of this invention to provide a unit for interconnecting otherwise independently operable digital computer systems.

Another object of this invention is to provide an interconnecting unit between digital computer systems which enables an instruction in one system to directly address a memory location in the other system.

Yet another object of this invention is to provide an interconnecting unit between two digital computer systems which is relatively simple to implement.

SUMMARY

In accordance with one aspect of this invention, a first digital computer system is characterized by a range of memory addresses which have no corresponding physical locations in the memories or peripheral units in the system. An interconnection unit responds to addresses in the unused range. It converts an address in this range into an address in a second digital computer system which does correspond to a physical memory location. The interconnection unit receives data from the first system in the same manner as a peripheral device. It then exchanges transfer control signals with the second digital computer system to act as an interrupting peripheral unit for that system. In similar fashion, the interconnnection unit may also transfer data from the second data processing system under the control of the first. Additionally, the interconnection unit can retrieve data from or send data to the first system under the control of the second system.

This invention is pointed with particularity in the appended claims. The above and further objects and advantages of this invention may be attained by referring to the following description taken in conjunction with the accompanying drawings.

DESCRIPTION OF AN ILLUSTRATIVE EMBODIMENT

Figure 1:
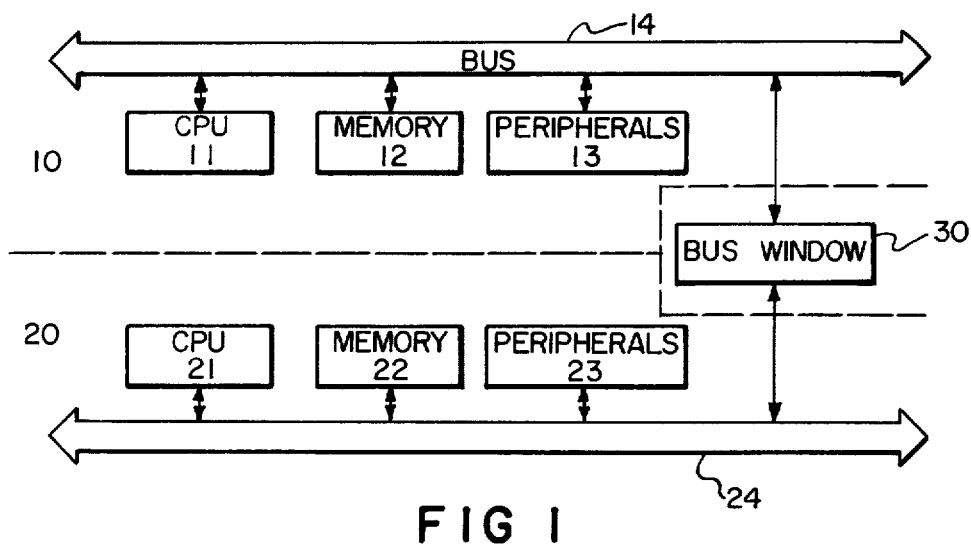
FIG. 1 illustrates two normally independently operated digital computer systems interconnected in accordance with this invention.

FIG. 1 depicts a data processing system including two digital computer systems. A first digital computer system 10 includes a central processor unit (CPU) 11, a memory 12 and peripherals 13 all connected in parallel to a bus 14. The second digital computer system 20 likewise comprises a CPU 21, a memory 22 and peripherals 23 in parallel on a bus 24. These systems 10 and 20 can operate independently of each other and, for purposes of explanation, it is assumed that each operates in accordance with the disclosures in the above-identified cross-references.

Each system uses a single set of addresses to identify locations in their respective memories and peripherals. The peripherals 13 and 23 may be assigned high order addresses. Other high order addresses may be reserved for storing other basic control information utilized in trap and interruption operations. The remaining addresses may designate locations in the memories 12 and 22. Assuming for example that 18-bit addresses are produced, then $777,777_8$ or 256K ($K=1024_{10}$) locations can be addressed, including all the locations assigned to peripherals and memory. In the systems described, locations can be addressed in terms of high and low byte positions; thus an 18-bit address identifies 128K full-word locations. Even numbers designate the one byte while odd numbers designate the other byte when byte addressing is used.

Figure 2:
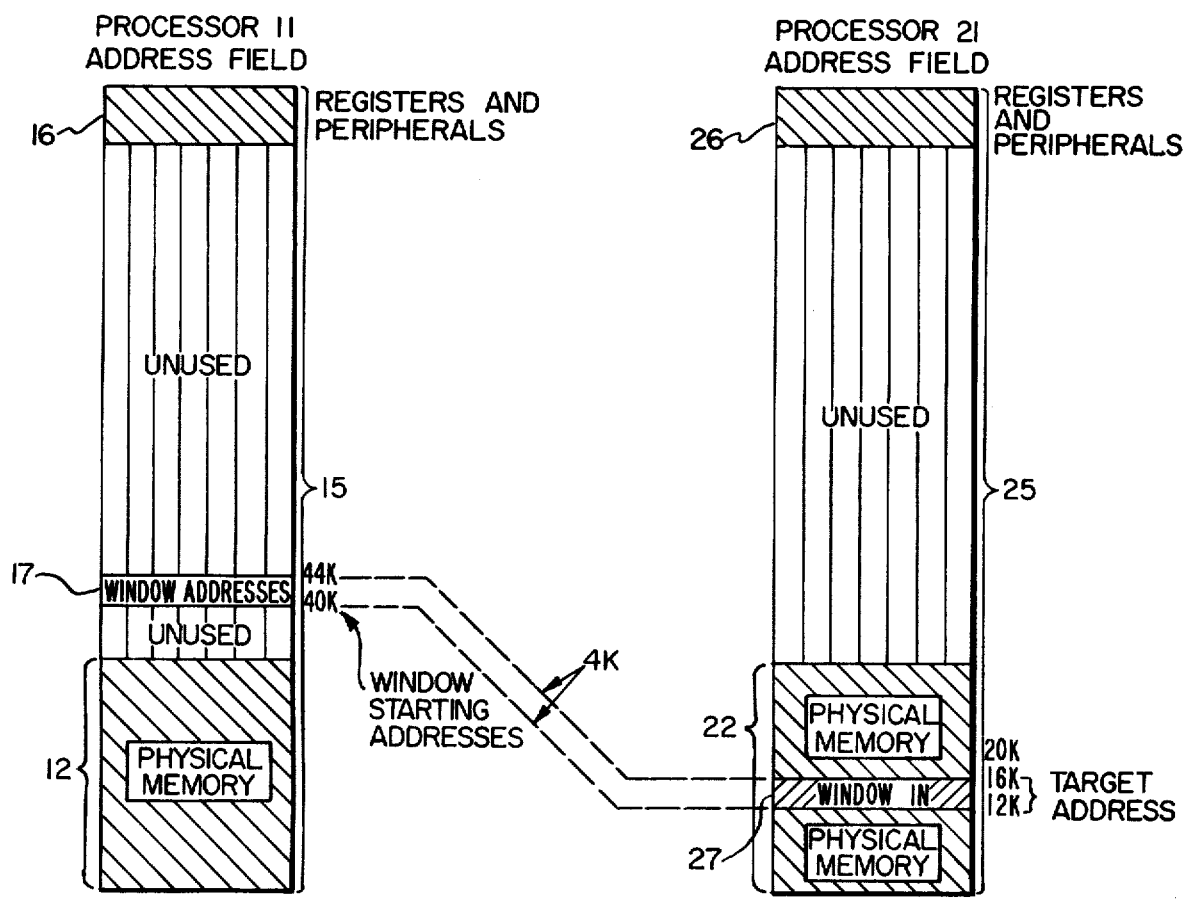
FIG. 2 illustrates the utilization of memory addresses in a typical digital computer system.

FIG. 2 shows the assignment of available location addresses in a typical system. Block 15 represents all the possible addresses. The addresses of the locations in memory 12 (i.e., the physical memory locations) are shown in the shaded block 12, while the block of addresses assigned to registers and peripherals are shown in the shaded block 16. The remaining possible addresses are not used; that is, there are no physical locations corresponding to those addresses.

Similarly block 25 represents the allocation of possible location addresses in the digital computer system 20 in FIG. 1. Shaded block 26 represents the addresses reserved for registers and peripherals while the shaded block 22 represents the physical memory addresses. Again there is a range of "unused" addresses which do not correspond to physical storage locations in the system.

It will be helpful to review the process of transfering data between two storage locations. In the system 10 (FIG. 1) either the CPU 11 or one of the peripherals 13 may control a data transfer over the bus 14. The unit controlling a transfer is a "master unit" while the unit responding to that control is a "slave unit." The master unit takes control of the bus 14 either through an interruption sequence, in the case of a peripheral unit, or active or passive acceptance of control by the CPU 11. A peripheral unit, for example, transmits a non-processor request (NPR) signal as an interruption signal onto a corresponding control wire in the bus 14. A priority arbitration unit (not shown but generally located in the CPU 11) grants the request at an appropriate time and, though a series of signals including a non-processor granting (NPG) signal and an acknowledgement (SACK) signal, control passes to the requesting peripheral unit.

A master unit assumes control by transmitting a BUSY signal indicating that the bus is, or is about to be involved in a transfer. Simultaneously, the master unit transmits address signals designating a data location (and slave unit) and direction control signals indicating that the data is being transferred from or to the master unit. In the first case, the data appears on the bus 14 at the same time as the address and direction control signals. After a settling delay, the master unit transmits a master synchronization (MSYN) signal. The slave unit will have decoded the address and direction control signals by the time it receives the MSYN signal. The designated slave unit responds by loading the data into the specified location and then transmitting a slave synchronization (SSYN) signal indicating the transfer is complete. When the master unit receives that SSYN signal, it terminates its MSYN signal which, in turn, enables the slave unit to terminate its SSYN signal. When both the SSYN and MSYN signals terminate, the master unit terminates its BUSY signal, enabling another master unit to take control of the bus.

If the master unit is to receive data, then no data appears on the bus 14 until the slave unit transmits the SSYN signal indicating that it has retrieved that data from the addressed location and has placed it on the bus 14. Otherwise the interaction between master and slave units is the same.

The digital computer system 20 in FIG. 1 operates in the same manner as the system 10 and the two systems are independently operable. However, in accordance with this invention system 10 can use resources in system 20 and vice-versa. An interconnecting unit provides this function. Effectively, the unit enables one system to "see" memory locations in the other system; for this reason we call the interconnecting unit a "bus window" 30.

The bus window 30 performs several functions. In order to simplify the understanding of these functions, it is helpful to define other terms. An "originating system" is one of the systems 10 or 20 which seeks access to the other system, the other system then being a "target system." The bus in the originating system is also called the "originating bus" and the other bus is the "target bus." Thus, if the digital computer system 10 needs to use the resources of the system 20, it uses the bus window 30 and is the originating system, while system 20 is the target system.

Referring to block 15 in FIG. 2, there is within the unused block of addresses, a section 17 which constitutes a range of input addresses for the bus window 30. The bus window 30 converts any window address generated by the originating system into an address of a physical memory location in the target system. As shown in FIG. 2, it converts them into locations in the block 22 associated with the system 20 as described below.

The bus window 30 operates in response to transfer control signals from the originating system and appears as "slave unit" on the originating bus. Furthermore, the bus window 30 can interrupt the operations of the digital computer systems and transfer data between itself and a location in the target system by interrupting the target system and transmitting and receiving appropriate transfer control signals, thus appearing as a master unit on the target bus.

Figure 3:
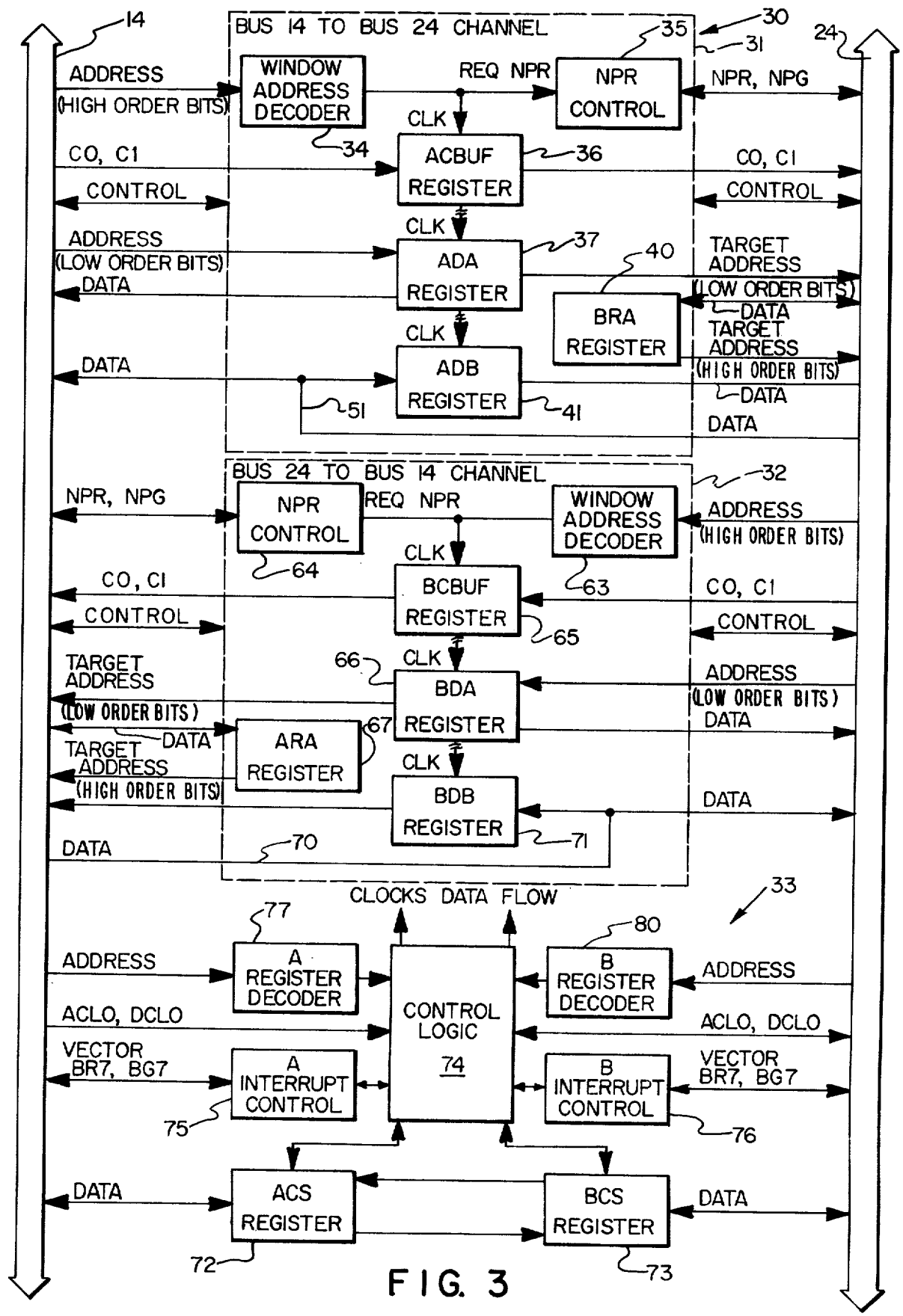
FIG. 3 is a block diagram of the interconnection unit shown in FIG. 1.

Now referring to FIG. 3, the bus window 30 which interconnects the buses 14 and 24 and their associated resources, comprises three basic sections. A data channel 31 operates when the bus 14 is the originating bus and bus 24 is the target bus; and a data channel 32, when the bus 24 is the originating bus. The data channels 31 and 32 may operate in a full duplex mode. A status and control circuit 33 provides appropriate timing, controlling and monitoring functions.

Referring to data channel 31, a window address decoder 34 receives a first set of address signals corresponding to high order address bits from address lines in the bus 14. When those bits indicate a window address, the decoder 34 enables the channel 31 to respond to subsequent transfer control signals on the bus 14.

If the bus 14 has eighteen address conductors and the least significant bit position identifies a high or low order byte, then the eighteen address bits can identify up to 128K addresses where $K=1024_{10}$. In order to simplify the structure of the window decoder, the window addresses have ranges of 1K, 2K, 4K, or 8K locations. The starting address for the window starts at an even boundary address for the size of the window. Thus, if the window decoder 34 is to be responsive to a 1K window, the bus window can start at any unused address evenly divisible by 1K. If the window is to be 4K, the starting address must be evenly divisible by 4K. For example, an address of $140000_8$ in which the least significant bit identifies a particular byte is really location 24K. This is a valid starting address for windows of 1K, 2K, 4K, or 8K.

With this particular starting address of $140000_8$, the window address decoder 34 responds if bits 17 and 16 contain ZERO's and bit 15 is ONE (i.e., A(17) = 0, A(16) = 0, and A(15) = 1.). For an 8K window the decoder 34 additionally tests for A(14) = 1. In this case, bits 14 through 17 constitute a first set of address signals and these are the high-order bits. Bits 0 through 13 are low-order bits and their corresponding signals define a second set of signals. For a 4K window, the decoder 34 responds whenever A(14) = 1 and A(13) = 0 while A(12) through A(0) are the low-order bits. If the decoder additionally monitors bit 12 as a high-order bit, the window is 2K while testing all of bits 11 through 17 is required for a 1K window. For different starting address, the decoder 34 monitors different values in the high-order bit positions. While this particular decoder is responsive to fixed addresses, more sophisticated window address decoders could provide more flexible addressing.

More specifically, the decoder 34, in response to a window address, produces an REQ NPR signal which enables an NPR control circuit 35 to transmit an NPR signal onto a corresponding NPR conductor in the bus 24 to thereby initiate an interruption in the system 20 (FIG. 1) as the target system. Further, the REQ NPR signal serves as a CLK signal to load direction control signals C0 and C1 into an ACBUF register 36 and an ADA register 37 to receive the low order address bits on the bus 14 as a displacement address. A BRA register 40 provides a starting relocation address which substitutes for the high order address bits on the originating bus 14. This substitution converts the starting window address into a starting location for the section 27 in block 25 (FIG. 2). An ADB register 41 is a data buffer used to hold data during a transfer from the originating bus 14 to the target bus 24. Transfers from the target bus 24 pass directly through the channel 31 on a conductor 51.

Figure 4:
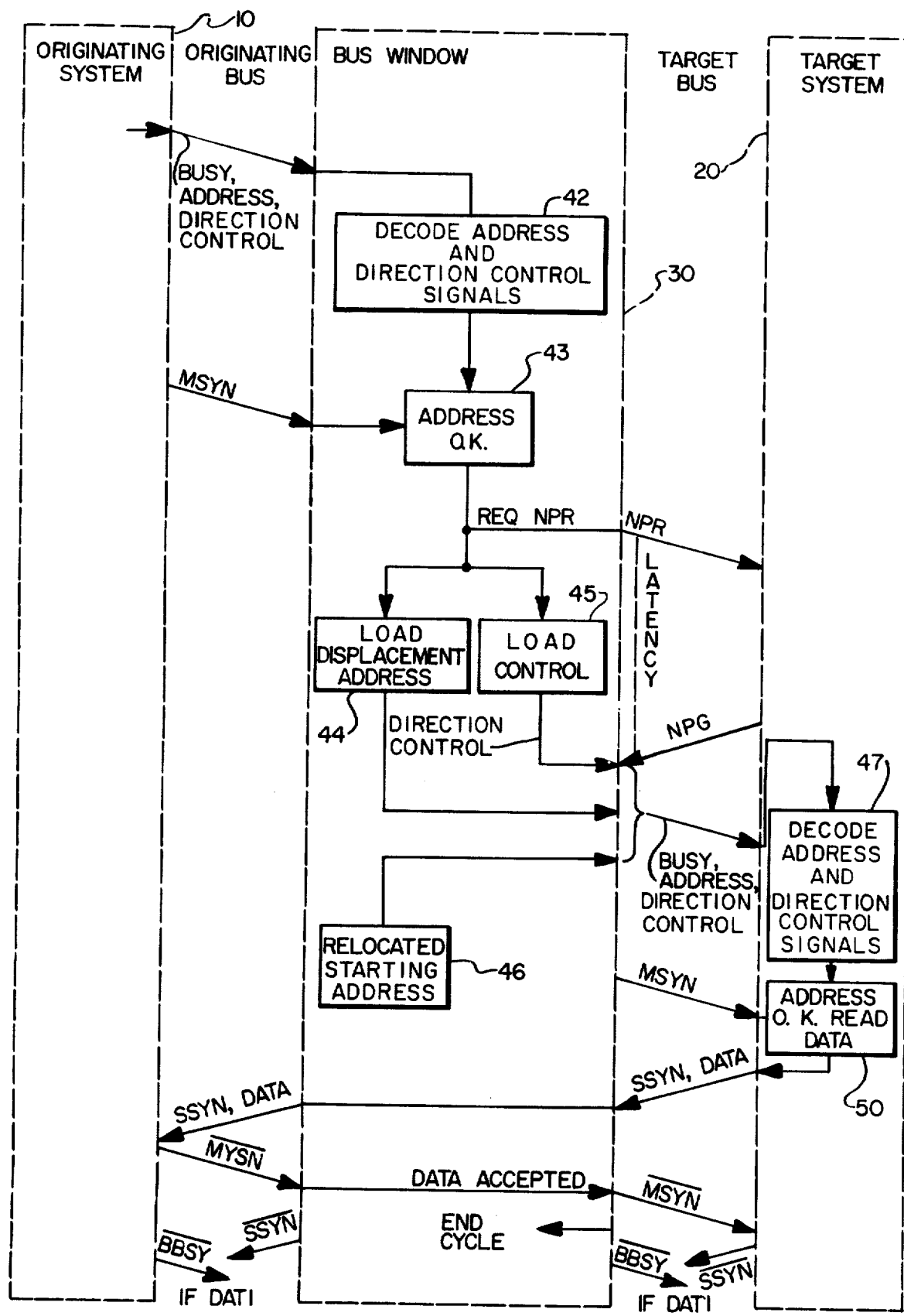
FIG. 4 is a timing diagram of transfer control signals used to transfer data from a first system to a second system.

Reference is now made to FIG. 3 and FIG. 4, which show the timing of various address, transfer, control, and data signals during a transfer from a location in the target system 20 to a location in the originating system 10. In FIG. 4, each block represents a step in the operation of one of the data channels 31 or 32 in FIG. 2. The following discussion is directed to transfers through the channel 31. The transfer initially begins with the CPU 11 or one of the peripherals 13 (FIG. 1) acting as a master unit. The master unit transmits the BUSY, address and direction control signals onto corresponding conductors on the bus 14. The window address decoder 34 then enables the bus window 30 (block 42). When an MSYN signal appears on the bus 14, the bus window begins serving as a slave unit on the bus 14 and interrupts the system 20 seeking to become a master unit on the bus 24. Specifically, if the address is valid (block 43), the bus window 30 transmits an NPR signal onto the bus 24. Also, the ADA register 37 stores the low-order address bits (block 44) and the ACBUF register 36 stores the direction control signals C0 and C1 (block 45). These operations occur before the target system 20 subsequently transmits the NPG signal in response to the NPR signal. The NPG signal indicates that the interruption request to the system 20 is granted.

Accordingly the bus window is now enabled to become a master unit on the bus 24. It does so by transmitting the BUSY signal, C0, and C1 direction control signals from the ACBUF register 36 and the displacement address from the ADA register 37. Bits stored in the BRA register 40 are substituted for the high-order bits in the address on the originating bus (block 46).

The addressed unit in the target system 20 decodes the address and control signals (block 47) prior to the receipt of an MSYN signal from the bus window 30. Upon receiving the MSYN signal, the unit in the target system 20 retrieves data from the target location, places the data on the data lines on the target bus 24 and transmits an SSYN signal (block 50).

This data passes directly through the data channel 31 on the conductor 51 (FIG. 3). The SSYN signal (FIG. 4) also passes directly through the data channel, as shown later, so that the master unit in the originating system 10 responds in a normal manner to accept the data. After a time delay, the master unit on the bus 14 stops sending the MSYN signal. This initiates two parallel sequences. First, the bus window 30 uses this as a DATA ACCEPTED signal, stops transmitting its MSYN signal and generates an internal END CYCLE signal indicating that the bus window 30 is now ready to start a new transfer. The slave unit in target system 20 then terminates its SSYN signal, so the bus window 30 can stop transmitting its BUSY signal onto the bus 24, thereby releasing it. Secondly, the bus window terminates its SSYN signal back to the bus 14 so that the master unit in the originating bus 14 can release the bus 14 by dropping its BUSY signal.

This sequence of operations occurs during normal transfers in which data is rewritten into a destructively read location. There are times when a programmer knows that new data will be rewritten into a location on the next transfer so that the automatic rewriting operation can be inhibited to speed up operations. In these cases it is desirable to maintain control over the bus until a subsequent writing operation is completed. One set of direction control signals indicates this operation; and, when produced, the control circuitry in the originating system 10 and the bus window 30 do not terminate their respective BUSY signals when the first SSYN signals terminate. Thus, the two systems remain interconnected through the bus window for the immediately subsequent transfer of data from the originating system 10 to the target system 20.

Figure 5:
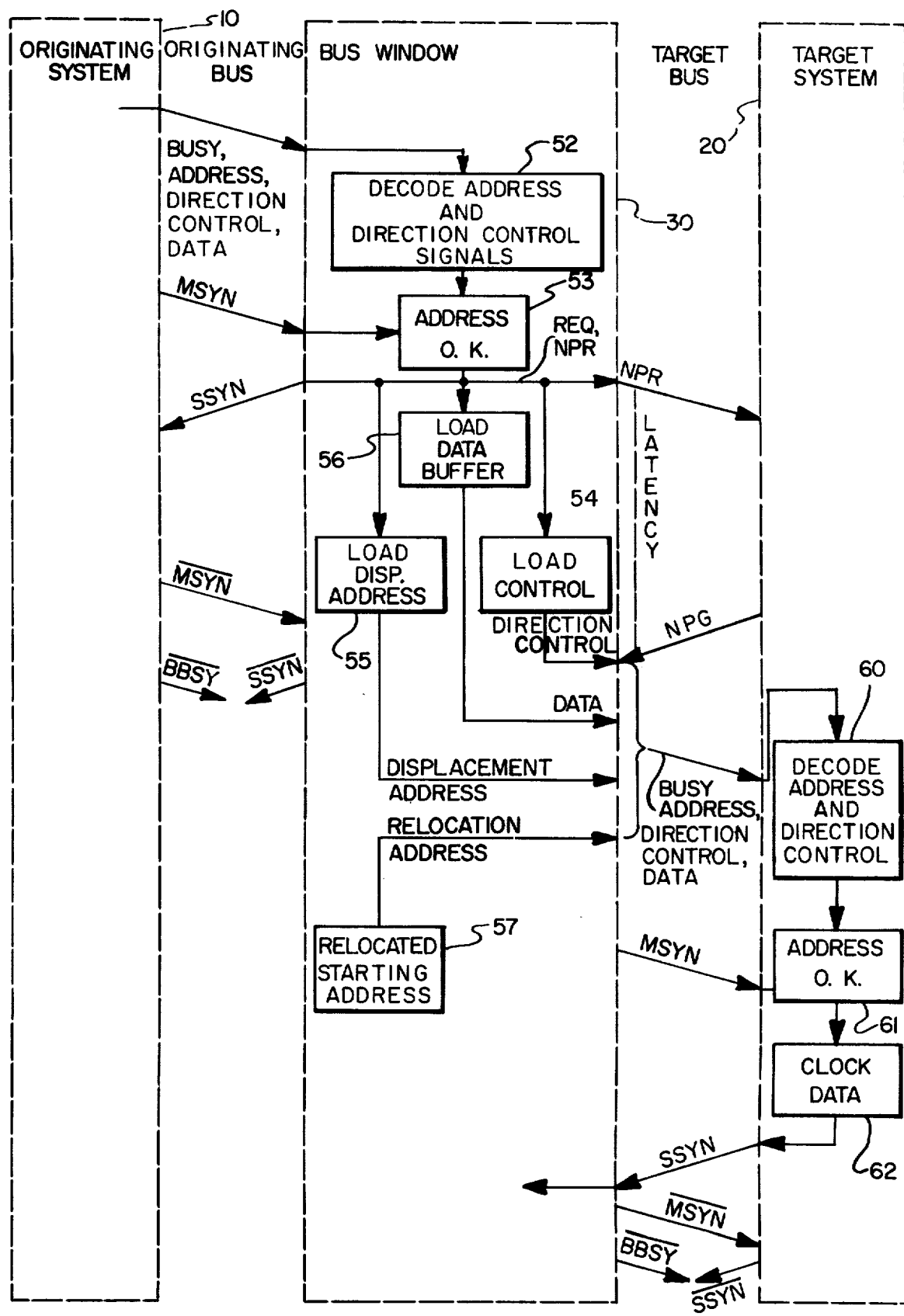
FIG. 5 is a timing diagram of transfer control signals used to transfer data from the second system to the first system.

Now referring to FIGS. 3 and 5, the data processing system 10 as the originating system can also transfer data to the target system 20. Initially it transmits the BUSY, window address, direction control and data signals onto the originating bus 14 simultaneously. The window address decoder 34 decodes the window address (block 52) to enable a subsequent MSYN signal at block 53 from the originating system 10 to perform several functions. Specifically, block 54 indicates the storage of direction control signals in the ACBUF register 36 in response to the completion of the operation in block 53. Block 55 indicates the simultaneous storage of the low-order address bits in the ADA register 37 as a displacement address. These are similar to the functions shown in FIG. 4. In addition, the MSYN signal also causes the NPR control circuit 35 to transmit an NPR signal onto the target bus 24. This NPR signal also loads the data on the originating bus 14 into the ADB register 41 (block 56) and produces an SSYN signal for the originating system 10. Once the ADB register 41 stores the data, the originating system 10 and bus window 30 disconnect. Specifically, the originating system 10 terminates its MSYN and BUSY signals in sequence after receiving, respectively, the leading and trailing edges of the SSYN signal. The bus window stops transmitting the SSYN signal in response to the termination of the MSYN signal.

Now referring to the subsequent interaction between the bus window 30 and the target system 20, the target system 20 processes the NPR request and returns an NPG signal after a delay. After receiving the NPG signal, the bus window 30 assumes control of the bus 24 as a master unit. It then transmits the BUSY, address, direction control, and data signals. The system 20 decodes the address and direction control signals (block 60) to enable circuitry to respond to the MSYN signal (block 61) which the bus window 30 generates after a short time delay. In response to the MSYN signal, the target system 20 stores the data on the data conductors in the identified location after a time delay (block 62). The target system 20 then transmits an SSYN signal back to the bus window 30 starting the sequence of terminating the MSYN, SSYN, and BUSY signals to disconnect the target system 20 and the bus window 30.

Thus, FIGS. 3 through 5 show the circuitry and timing and control signals necessary to effect a transfer to or from the bus 14 when it is the originating bus. Data channel 32 (FIG. 3) performs a similar function when the bus 24 is the originating bus. Specifically, the channel 32 contains a window address decoder 63 for decoding high order address bits from the bus 24. This window address decoder 63 responds to a range of otherwise unused addresses on the bus 24 and can define a window of any size, dependent only upon the previously described restrictions. An NPR control circuit 64 transmits NPR signals and receives NPG signals when the channel 32 is activated. A BCBUF register 65 recieve the C0 and C1 direction control signals from the bus 24 and transmits them to the bus 14. The low order address bits from the bus 24 are stored in a BDA register 66, the high order address bits identifying the base physical location being stored in an ARA register 67. A bus 70 transfers data from the bus 14 as a target bus directly to the bus 24 while a BDB register 71 buffers data when it is transmitted to the bus 14 from the bus 24. These circuits operate analogously to those in the data channel 31 and are not discussed further.

The bus window 30 in FIG. 3 also contains other data paths. These paths enable one or the other of the digital computer systems to obtain information about or alter the characteristics of the bus window 30. For example, the digital computer system 10 can address the ADA register 37 and read its contents for diagnostic or other purposes. In this sense, the ADA register is like any other register with an address in block 16 (FIG. 2). Similarly, the BRA register 40 has an address in block 26 so the digital computer system 20 can alter the starting address for the window in the system 20. In the data channel 32, the system 20 can read the contents of the BDA register 66. The starting address stored in the ARA register 67 can be altered by the system 10.

The status and control circuit 33 of FIG. 3 includes the circuitry for responding to signals on the buses 14 and 24 to connect these and other registers to their respective buses or to perform other functions. For example, an ACS register 72 and a BCS register 73 store data for use by the respective systems 10 and 20. The ACS and BCS registers 72 and 73 are used to transfer information about various system operating parameters and interruption requests from one system operating parameters and interruption requests from one system to the other. A control logic circuit 74 can alter or use the contents of either register 72 or 73. An A interrupt control circuit 75 can generate a BR interruption request onto the bus 14. Unlike an NPR request, a BR request can only be granted when the central processor unit 10 completes an operating cycle for the system because the central processor unit is actively involved in granting the request. This is a priority request, usually with the highest priority, and it appears as a BR signal on the bus 14. When the digital computer system 10 grants such an interruption, it sends a BG signal of the same priority back to the A interrupt control circuit 75. Thereafter, there is a sequence of signal transfers during which the A interrupt control circuit sends VECTOR signals identifying certain registers in the block 16 (FIG. 2) onto the bus 14. The data processing system 10 then begins an interruption routine identified by the contents of a vectored register. A B interrupt control circuit 76 performs similar functions with respect to the digital computer system connected to the bus 24 and both the A and B interrupt control circuits 75 and 76 have bidirectional communications links with the control logic circuit 74. An M 7821 Interrupt Control Module described in the above-identified PDP-11 Peripherals and Interfacing Handbook can perform this function.

An A register decoder 77 selects one of five registers including the ADA register 37 and ARA register 67. Addititionally, the A register decoder 77 responds to the addresses of the ACS register 72, the ADB register 41 and the ARA register 67. Similarly, a B register decoder 80 is responsive to the addresses on the target bus 24 for identifying the BCS register 73, the BDB register 71, the ADB register 41, the BDA register 66, and the BRA register 40. Each register has an address in the blocks 16 or 26 (FIG. 2). Either system may read the contents of the registers it can address. Further, the digital computer system 10 can alter the contents of the ACS register 72, the ADB register 67 while the system 20 can alter the contents of the BCS register 73, the BDB register 71 and the BRA register 40. The process for altering an addressed register is known in the art.

Figure 6:
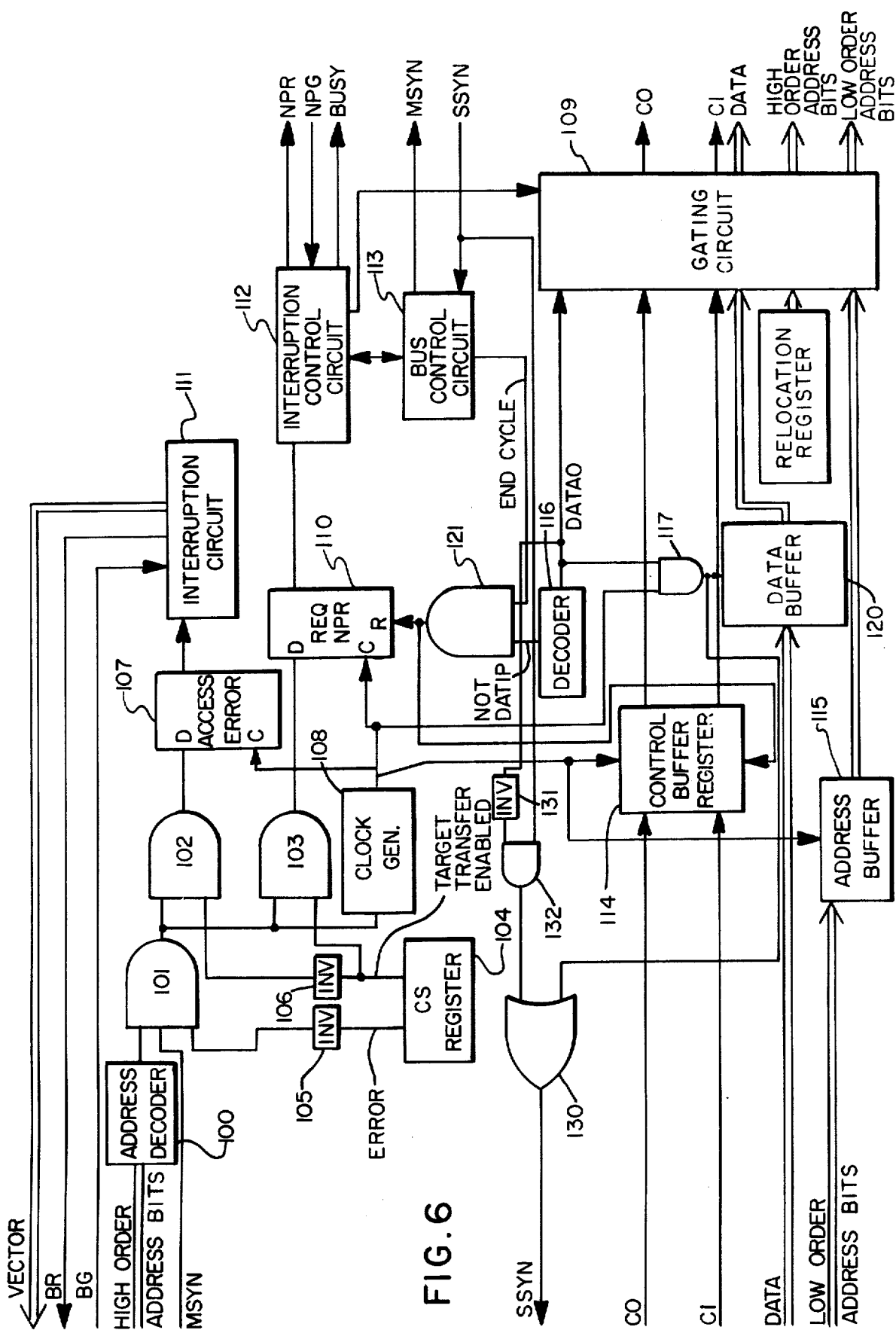
FIG. 6 is a circuit diagram of the control logic used in the interconnection unit FIG. 3.

FIG. 6 shows the various elements in a data channel, the logic for controlling those elements and other signal sources. It is not discussed with reference to either data channel 31 or 32 but it will be apparent that certain elements must be duplicated for each system. Signals to or from the left of FIG. 6 represent signals to or from an originating bus, while signals to or from the right side of FIG. 6 represent signals to or from the target bus.

Whenever the originating system addresses the bus window, an address decoder 100 provides one enabling input to an AND gate 101 using, for purposes of this discussion, positive assertion logic (i.e., a positive voltage is a logical ONE or TRUE value). This permits a subsequent MSYN signal from the originating bus to pass through the AND gate 101 to an AND gate 102 and an AND gate 103. If an ERROR bit position in a CS register 104 contains a ONE, an inverter 105 disables the AND gate 101. Conditions producing an asserted ERROR signal are described later. If the target system is not enabled, an inverter 106 responds to a non-asserted TARGET TRANSFER ENABLED signal from the CS register 104 to enable the AND gate 102. The non-asserted signal disables the AND gate 103. Thus, if the originating bus issues a bus window address when the target system is not enabled, the AND gate 102 enables an ACCESS ERROR flip-flop 107 to set after a delayed pulse from a clock generator 108. Any time the bus window 30 is addressed properly and receives a MSYN signal, the AND gate 101 enables the clock generator 108 to produce the delayed clocking pulse.

If the ACCESS ERROR flip-flop 107 sets, it enables an interruption circuit 111 which responds by generating a BR signal requesting the originating system to interrupt its operations at the end of a current operating cycle. When that request is granted the interruption circuit 111 receives a BG signal indicating the request is being granted. The interruption circuit 111 also includes the means for generating VECTOR signals to identify the necessary interruption routine.

Normally, however, CS register 104 contains a ONE in the TARGET TRANSFER ENABLE bit position, so the AND circuit 103 applies data input to the REQ NPR flip-flop 110. As a result, the clock generator 108 sets the REQ NPR flip-flop 110 and thereby enables an interruption control unit 112, which generates the NPR request onto the target bus. When the target system subsequently grants this NPR request, the interruption control unit 112 eventually transmits the BUSY signal as previously discussed and effectively connects the data channel to the target bus as a master unit. Specifically, when the data channel becomes a master unit, the interruption control unit 112 enables a gating circuit 109 to couple address and direction control signals onto the bus. If data is transferring to the target bus, data signals are not coupled through the gating circuit 109. The interruption control unit control circuit 112 also provides a signal to a bus control circuit 113, which generates a MSYN signal onto the target bus and receives an SSYN signal as also discussed previously. The interruption control circuit 112 and bus control circuit 113 can be constructed with M796 and M7821 modules described in the above-identified *PDP-11 Peripherals and Interfacing Handbook*.

The clock pulse from the clock generator 108 also passes to a control buffer register 114. This buffer represents either the ACBUF register 36 or the BCBUF register 65 in FIG. 3. The C0 and C1 direction control signals are stored in the register 114 with the output appearing at the input to the gating circuit 109, and thus on the C0 and C1 direction control lines for the target bus.

The same clock pulse transfers the low order address bits from the originating bus into an address register 115 which corresponds to either the ADA register 37 or the BDA register 66 in FIG. 3. These address bits pass through the gating circuit 109 and appear without modification as low order address bits on the target bus.

A decoder 116 receives the direction control bits from the control buffer register 114. If the C0 and C1 signals indicate that data is to be transferred from the originating bus to the target bus, the decoder 116 issues a DATAO signal and enables an AND gate 117 to load data on the data lines of the originating bus into a data buffer 120 which corresponds to the ADB register 41 or the BDB register 71 in FIG. 3. The signal from the AND gate 117 also passes through an OR gate 130 as an SSYN signal. The DATAO signal also enables the data gates in the gating circuit 109.

When the direction control signals indicate a transfer from or a normal transfer to the originating bus (i.e. one in which a destructively read location is restored), the decoder 116 uses a NOT DATIP signal to enable an AND gate 121 to pass an END CYCLE signal from the bus control circuit 113 to reset the flip-flop 110 and enable the circuit 112 to terminate the BUSY signal while simultaneously clearing the control buffer register 114 and disabling the gating circuit 109. An inverter 131 receives the DATAO signal and provides one input to an AND gate 132. The SSYN signal from the target bus is the other input. Thus, when data is read from the target system, the AND gate 132 transmits the SSYN signal through the OR gate 130.

If the decoder 116 does not enable the AND circuit 121, a reading operation from the target bus is followed by the transfer of data from the originating bus to the target bus. In this case the interruption control circuit 112 maintains the BUSY signal so the bus window keeps its control over the target bus.

Figure 7:
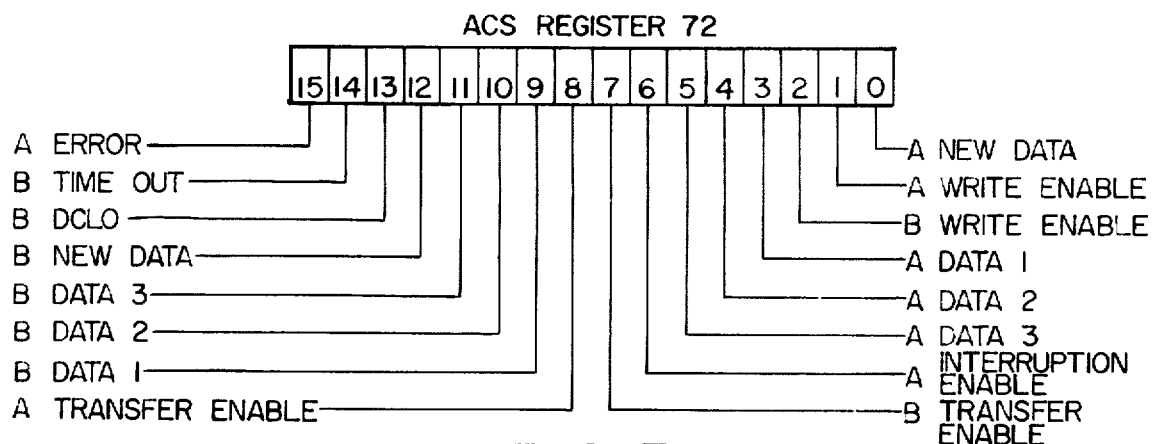
FIG. 7 shows the organization of a control and status register shown in FIG. 3.

The ACS and BCS registers 72 and 73 (FIG. 3) have an analogous function in association with their respective systems 10 and 20. FIG. 7 shows the organization of the ACS register 72. The digital computer system 10 can address this register to either read or alter its contents. Circuitry in the control logic 74 sets the previously discussed A ERROR bit, bit 15, whenever the digital computer system 10 connected to the bus 14 as an originating bus cannot access the target bus. This occurs if the other bus is not available for a transfer, (i.e., bit 7 is set to a ZERO) the transfer of data is to be made to the bus 24 and the B WRITE ENABLE bit is reset, (i.e., bit 2 is set to a ZERO) or an extraordinary period of time elapses between the generation of an MSYN signal onto the bus 24 and the receipt of an SSYN signal, (i.e., bit 14 is set to a ONE, bit 14 being a B TIME OUT bit). If the DC power on the bus 24 decreases below a safe value a B DCLO bit is set (bit 13 is a ONE).

If an A INTERRUPTION ENABLE bit is set (bit 6 is a ONE), setting bit 15 will cause the control logic 74 and the A interruption control logic 75 to respond to the A ERROR bit. They interrupt the operation of the originating digital computer system 10 connected to the bus 14.

Bit 12 is a B NEW DATA bit. When it has a ONE, the BCS register 73 or the BDB register 71 in FIG. 3 has new information. It is set whenever the control logic 74 senses that bit 0 in the BCS register 73 is set. Any time bit 12 in the ACS register 72 is set, the status and control circuit 33 interrupts the digital computer system 10 if bit 6 is set. The resulting interruption routine clears the B NEW DATA bit 12 and the control logic 74 clears bit 0 in the BCS register 73.

The digital computer system 10 can only read bits 9 through 11 in the ACS register 72. These three bits are used to pass parameters between systems. They are defined by the program passing the parameters. Thus, bits 9 through 12 and bits 0 and 2 through 4 provide a cross-interruption capability. That is, if system 20 needs to interrupt system 10 at some point in the program, the programmer writes an instruction to alter the contents of the BDB register 71 or the BCS register 73. This includes loading a ONE into bit 0 of the BCS register 73. The control logic senses this new value and sets bit 12 in the ACS register 72. If bit 6 contains a ONE, the A interrupt control unit 75 initiates an interruption operation. A similar operation occurs if it is necessary to interrupt operations in the system 20 from the system 10. Programs in the interrupted system may respond by using the NEW DATA bits to obtain parameters and provide other information useful in servicing the interruption request. For example, the data which transfers may eliminate polling steps which would otherwise be necessary to determine the exact nature of the interruption. Thus, the bus window 30 provides a cross-interruption capability which can be a very important programming tool in multiple system configuration.

Bit 8 is a TRANSFER ENABLE bit for the digital computer system 10 connected to bus 14. When set, this bit position indicates that the digital computer system 10 can be used as a target system and that the ARA register 67 contains an address. The BCS register 73 contains the corresponding information in bit 7. Similarly, the B TRANSFER ENABLE bit appears in the ACS register 72 as bit 7 to indicate that the system connected to the bus 24 may be used as a target system.

The digital computer system 10 can alter bits 3 through 5. These are A DATA bits. The control logic 74 transfers the information to bits 9 through 11 in the BCS register 73. Bit 2 in the ACS register 72 contains the B WRITE ENABLE bit while bit 1 contains the A WRITE ENABLE bit. Conversely, the BCS register 73 has the B WRITE ENABLE bit information in bit 1. Bit 2 contains the A WRITE ENABLE bit. Bit 2 can only be read by the digital computer system while bit 1 may be read or written. If the direction control signals on the bus 14 as an originating bus indicate a writing operation and bit 2 is reset, circuitry in the control logic can block the REQ NPR flip-flop 110 (FIG. 6) and enable the ACCESS ERROR flip-flop 107 to set.

There is no discussion of the circuitry in the control logic 74 which alters the particular state of any specific bit position. Such circuits are known in the art and apparent from the previous functional discussion.

Figure 8:
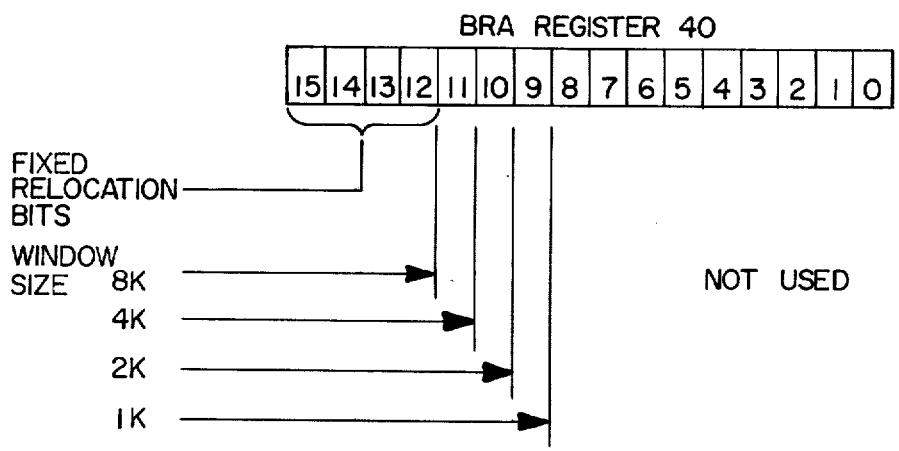
FIG. 8 shows the organization of a relocation address register shown in FIG. 3.
Figure 9:
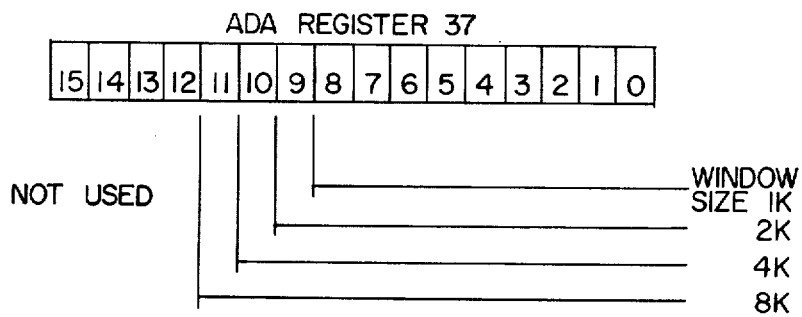
FIG. 9 shows the organization of a displacement address register shown in FIG. 3.

FIG. 8 shows the BRA register 40 and FIG. 9, the ADA register 37. In the BRA register 40, bits 12 through 15 identify the base address for any window size up to 8K, and bits 0 through 8 are never used. Similarly, bits 0 through 8 in the ADA register 37 are always used in a displacement address while bits 12 through 15 are never used. The respective boundaries between the used and unused areas of the BRA register 40 and ADA register 37 are complementary. For a 1K window size, the BRA register 40 contains relocation bits in positions 9 through 15 while the ADA register 37 contains displacement information in bits 0 through 8. If the window is an 8K window, the BRA register contains information in bits 12 through 15 while the ADA register 37 contains displacement information in bit positions 0 through 11. Analagous organizations are found in the ARA register 67 and the BDA register 66.

Now referring to FIGS. 1, 2, and 3, the bus window 30 provides bidirectional communication paths between the buses 14 and 24. The bus window 30 can be considered as having two ports: one connected to the bus 14, and the other connected to the bus 24. While the addresses for channel 31 are in a fixed range, the digital computer system 20 relocates those addresses in itself. In accordance with the objects of this invention, the bus window 30 thus interconnects otherwise independently operable digital computer systems 10 and 20. A program instruction processed by the CPU 11 in the digital computer system 10 for example, performs the transfer through the bus window 30 without any programmer intervention. The bus window 30 controls this transfer; hence, timing and synchronizing considerations in prior systems are eliminated.

This interconnecting device has been described in terms of a specific data processing system. It will be apparent, however, that the utilization and manipulation of the various transfer control, address and data signals may be altered to conform with the requirements of other systems. While specific circuit details have been shown, it is well known that many equivalents for those particularly disclosed circuits exist. Therefore, it is the object of the appended claims to cover all such variations and modifications as come with the spirit and scope of this invention.

What I claim as new and desire to secure by Letters Patent of the United States is:

1. In a data processing system including first and second buses for transferring data, address and control signals, means with a plurality of first storage locations connected to said first bus, each of said first storage locations being identified by an address on said first bus, means connected to said first bus for generating addresses including addresses for said first storage locations and other addresses, means for transmitting onto said first bus first transfer control signals for effecting a data transfer over said first bus, and means with a plurality of second storage locations connected to said second bus, each of said second storage locations being identified by an address on said second bus, the improvement of interconnecting means connected to said first and second buses comprising:
- A. a bidirectional data path for coupling data signals between the first and second buses,
- B. decoding means responsive to preselected ones of the other addresses on said first bus for enabling said interconnecting means,
- C. means responsive to the receipt of one of the preselected addresses in said decoding means for converting an address on the first bus to an address on said second bus corresponding to one of said second storage locations,
- D. means responsive to the first transfer control signals on the first bus for transferring data between said first bus and said bidirectional data path, and
- E. means for generating second transfer control signals in response to the address and first transfer control signals, said data processing system additionally including means responsive to second transfer control signals on said second bus for transferring signals between said second bus and the second addressed location identified by the address from said address conversion means to thereby transfer the data between said bidirectional data path and said one of said second storage locations.

2. A data processing system as recited in claim 1 wherein said bidirectional data path additionally comprises
  i. a storage register for receiving data from said first bus, and
  ii. means responsive to the first transfer control signals and said decoding means for enabling said storage register to store data.

3. A data processing system as recited in claim 1 wherein the address signals include first and second groups of signals, said decoding means being responsive to the first group of signals and said address conversion means additionally comprising means for storing a substitute group of address signals and means for concatenating the substitute group of address signals with the second group of address signals to thereby identify one of said second storage locations.

4. A data processing system as recited in claim 3 wherein said data processing system additionally includes means connected to the second bus for generating addresses for said second storage locations and means for transmitting onto the second bus second transfer control signals and wherein said storage means for the substitute group of address signals is one of the addressed second storage locations, said system additionally comprising means connected to said second bus for altering the contents of said storage means for the substitute group of address signals in response to the address and second transfer control signals.

5. A data processing system as recited in claim 1 wherein said second transfer control signal generating means includes:
  i. means for transmitting onto the second bus an interrupting request signal in response to the receipt of a preselected address in said decoder means, said data processing system additionally including means responsive to the receipt of an interrupting request signal on the second bus for performing an interruption operation, and
  ii. means for generating signals for effecting a transfer of data during the interruption operation.

6. A unit for connection to a data processing system including first and second independently operable digital computer systems, each digital computer system including a set of physical locations identified by memory addresses and connected to a bus including address, control and data signal paths and means for effecting a transfer between locations on the bus, said unit interconnecting the first and second digital computer systems and said unit comprising:
- A. a first channel responsive to one of a preselected plurality of memory addresses other than addresses for physical locations in the first digital computer system for effecting a data transfer between the first system bus as an originating bus and the bus in the second digital computer system as a target bus,
- B. a second channel responsive to one of a preselected plurality of memory addresses other than addresses for physical locations in the second digital computer system for effecting a data transfer between the second system bus as an originating bus and the bus in the first digital computer system as a target bus,
- C. each of said channels including:
  i. an address decoder responsive to the receipt of address signals corresponding to the preselected plurality of memory addresses on its originating bus for selecting the channel,
  ii. means connected to said address decoder for converting the address on the originating bus to an address for a physical location on the target bus in response to the receipt by said decoder of the address signals corresponding to the preselected plurality of memory addresses,
  iii. first channel transfer means responsive to the transfer means in the digital computer system connected to the originating bus and enabled by said address decoder for transferring data between said channel and the originating bus, and
  iv. second channel transfer means responsive to said address decoder for generating transfer control signals onto the target bus, the transfer means in the digital computer system connected to the target bus transferring data between the channel and the target bus in response to the transfer control signals.

7. An interconnecting unit as recited in claim 6 wherein said address signals include first and second groups of signals, each said address decoder being responsive to the first group of address signals on its originating bus, said address conversion means additionally including a relocation register for storing a substitute group of address signals to be substituted for the address signals in the first group to thereby define the physical location on the target bus.

8. An interconnecting unit as recited in claim 7 wherein said relocation register constitutes one of the physical locations connected to the target bus and the digital computer system connected to the target bus alters, the contents of said relocation register.

9. An interconnecting unit as recited in claim 6 wherein each digital computer system generates transfer control signals including signals indicating the direction of a data transfer, each channel additionally comprising a control buffer register for storing the direction signals from the originating bus and means for enabling said control buffer register when an address in the originating bus identifies said interconnecting unit.

10. An interconnecting unit as recited in claim 9 wherein said bidirectional data path in said channel comprises a data buffer register for receiving data from the originating bus in response to the first direction signals indicating a transfer of data to the target bus.

11. An interconnecting unit as recited in claim 10 wherein said bidirectional data path in the channel comprises a direct data path between the originating and target buses for receiving data from the target bus in response to other direction signals indicating a transfer of data to the originating bus.

12. An interconnecting unit as recited in claim 6 wherein each digital computer system includes means for generating onto the originating bus a master synchronization signal after address and transfer control signals are present on the originating bus, said first channel transfer means including means responsive to a master synchronization signal from the originating bus for generating a slave synchronization signal onto the originating bus upon the completion of a data transfer over the originating bus.

13. An interconnecting unit as recited in claim 12 wherein said second transfer means includes means responsive to said address decoder for transmitting onto the target bus an interruption request signal thereby to interrupt operations in the digital computer system connected to the target bus, means responsive to the granting of the interrupt request for transferring address signals from said converting means and transfer control signals onto the target bus and means for transmitting a delayed master synchronization signal onto the target bus, the digital computer system responding to the master synchronization signal by generating a slave synchronization signal upon the completion of a transfer over the target bus.

14. An interconnecting unit as recited in claim 6 wherein said interconnecting unit additionally comprises a status and control means for passing information between the first and second digital computer systems and wherein said status and control means includes:
   i. a status register for each channel, each status register including a first bit position designating whether its corresponding channel has new data, and a second bit position designating whether the other channel has new data,
   ii. control means for setting the second bit position when the first bit position is set, and
   iii. means connected to the corresponding channel and responsive to the second bit position being set for generating an interrupting request signal to the corresponding system.

15. An interconnecting unit as recited in claim 14 wherein said status register additionally includes data bit positions, the contents of said first and second bit positions indicating whether new data is present in said data bit positions in the corresponding status registers.

16. An interconnecting unit as recited in claim 14 wherein said each of said channels additionally comprises a data buffer and wherein the first bit position in said status register indicates whether new data is present in the data buffer in the corresponding channel and the second bit position indicates whether new data in the data is present buffer of the other of said channels.

17. An interconnecting unit as recited in claim 14 wherein said status and control means includes:
   i. first and second multi-bit status and control registers each constituting a physical location in their respective digital computer systems, said respective digital computer system being connected for altering the contents of predetermined bit positions, and
   ii. an address decoder responsive to an address of said status and control register for enabling the corresponding register.

18. An interconnecting unit as recited in claim 17 wherein the contents of a first bit position in each of said status and control registers indicates whether an error condition exists and the contents of a second bit position indicates whether the corresponding digital computer system may be interrupted, said status and control circuit means additionally including means responsive to the contents of the first and second bit positions for generating interruption signals for the respective digital computer system.

19. An interconnecting unit as recited in claim 18 wherein certain bit positions in one of said status and control registers associated with one of said digital computer systems contain information about the status of the other digital computer system.

* * * * *

UNITED STATES PATENT OFFICE
CERTIFICATE OF CORRECTION

Patent No. 3,940,743          Dated February 24, 1976

Inventor(s)    Brian P. Fitzgerald

It is certified that error appears in the above-identified patent and that said Letters Patent are hereby corrected as shown below:

Column 4, line 10, delete "though" and insert --through--
Column 8, line 42, delete "operating parameters and interruption requests from one system"
Column 9, line 3, delete "Addititionally" and insert --Additionally--
Column 11, line 1, delete "ZERO" and insert --ONE--
Column 16, line 18, after "present" insert --in the data--
          line 36, delete "circuit"

Signed and Sealed this

Thirteenth Day of July 1976

[SEAL]

Attest:

RUTH C. MASON
Attesting Officer

C. MARSHALL DANN
Commissioner of Patents and Trademarks